United States Patent [19]
Gravitt, Jr.

[11] 3,835,315
[45] Sept. 10, 1974

[54] SYSTEM FOR DETERMINING PARAMETERS OF A PARTICLE BY RADIANT ENERGY SCATTERING TECHNIQUES

[75] Inventor: Claude C. Gravitt, Jr., Rockville, Md.

[73] Assignee: The United States of America as represented by the Secretary of Commerce, Washington, D.C.

[22] Filed: Dec. 6, 1972

[21] Appl. No.: 312,529

[52] U.S. Cl............. 250/218, 250/225, 250/222 R, 250/227, 356/103
[51] Int. Cl. .......................................... G01n 21/26
[58] Field of Search ..... 250/221, 222, 222 PC, 218, 250/227, 225, 393; 356/102–104, 207

[56] References Cited
UNITED STATES PATENTS

| | | | |
|---|---|---|---|
| 3,049,047 | 8/1962 | Polanyi et al. | 250/222 PC X |
| 3,395,794 | 8/1968 | Petry | 250/222 X |
| 3,462,608 | 8/1969 | Weston et al. | 250/218 |
| 3,659,111 | 4/1972 | Weaver et al. | 250/225 X |
| 3,705,771 | 12/1972 | Friedman et al. | 356/104 X |

Primary Examiner—Walter Stolwein
Attorney, Agent, or Firm—David Robbins

[57] ABSTRACT

A collector contains a hole and annular apertures for transmitting a pair of conical, coaxial sheets of radiant energy. A beam of energy is directed through the hole, whereby a scattering volume is defined by the beam diameter and the fields of view of the apertures. When a particle moves through the volume, enery is scattered through the apertures and is detected to generate a pair of signals, each having a magnitude dependent upon the intensity of the energy in one of the conical sheets. A device responds to the magnitudes of the signals to indicate the size or nonspherical characteristics of the particle.

7 Claims, 7 Drawing Figures

SYSTEM FOR DETERMINING PARAMETERS OF A PARTICLE BY RADIANT ENERGY SCATTERING TECHNIQUES

BACKGROUND OF THE INVENTION

This invention relates to a system that may be used in determining the size and nonspherical characteristics of particles by radiant energy scattering techniques.

The system is useful in any situation where it is desired to know the size and nonspherical characteristics of particulate matter, and is able to detect changes in these parameters almost instantly. In addition to its potential in air pollution monitoring and studies, the system has wide application in general aerosol studies —cloud physics, fuel atomization, mine and industrial dust studies, paint spraying, smoke characterization, for example —and in studies of the physiological effects of particulates, as well as similar work with liquid samples when another sample delivery device is used.

Techniques involving the scattering of light have long been employed in the investigation of particles and aerosols where the index of refraction of the scatterer is known. However, in those instances where a wide and unknown range of indices of refraction may exist in the sample it has been rather ambiguous to use these techniques. In contrast, the measurements taken with this invention to indicate particle size are essentially independent of the index of refraction, as will be apparent from the following description of the scientific principles underlying the inventive concept.

Particles in the 0.05 to 10 micron size region can be characterized by their radius of gyration, regardless of their actual shape. Using the Debye theory of light scattering (see for instance, *Molecular Forces*, by Ben Chu, John Wiler and Sons, New York (1967), Chapter 6), the small angle region of the particle scattering intensity, $I(q)$, is given by $$I(q) = CV^2(n-1)^2[1-(q^2r_g^2)/(3) + \ldots ] \quad (1)$$

where $q = 4\pi/\lambda(\sin \theta/2 0)$, $\lambda$ is the wavelength, $\theta$ the scattering angle, and $r_g$ the radius of gyration. $C$ is a constant containing instrumental factors, $n$ is the refractive index of the particle, $V$ is the volume of the particle, and it is assumed that the medium in which the experiment is carried out has an index of refraction of 1.

Thus at a fixed angle, the scattered intensity is dependent on the size of the particle and its index of refraction. It is the wide range of $n$ for particles in air that has restricted the application of this method in the past. However, if the intensity is measured at two small angles and the ratio of these two intensities determined, then the dependence on $n$ is removed and the radius of gyration is a function of only the intensity ratio. FIG. 2 represents the dependence of the particle size to the ratio of the scatter intensity at two angles, that is, the ratio of the scatter intensity at angle $\alpha$ to the scatter intensity at angle $\beta$.

It has also been shown by a completely different approach (Hodkinson, Appl. Optics 5, 839 (1966)) that this ratio concept is a valid method of sizing particles, essentially independent of $n$, according to the Mie and Fraunhofer theories of particle scattering.

An arrangement in the prior art, that embodys these principles, uses a beam of light that is split into two parts in an interesting but complicated set of rotating mirrors and apertures, and each of the two beams is formed into a conical shape by annular diaphrams. The beams are then alternately directed upon and scattered by a particle carried through a chamber. The scattered light falls upon a pair of detectors and is converted to a pair of electrical signals that become the input to an oscilloscope. One signal appears as abscissa and the other as ordinate in a system of coordinates on the screen of the oscilloscope. When the measured particle leaves the scattering chamber, a line is triggered on the screen that passes from the zero point through the coordinates related to the scattered light. Because the slope of this line represents the ratio of scattered light intensity, it indicates the particle size associated with the ratio. (See "Optical Particle Size Spectrometer" by Rudolf Teucher which appeared in Dechema Monographien, 44, pp 83–89 (1963)).

SUMMARY OF THE INVENTION

The present invention employs a collector, that comprises a hole and first and second apertures, for transmitting a pair of conical sheets of radiant energy. A beam of radiant energy is generated and directed through the hole, whereby a scattering volume is defined by the beam diameter and the fields of view of the apertures.

When a particle moves through the scattering volume, radiant energy in the beam is scattered. Scattered energy in the form of conical sheets is transmitted through the apertures and generates a pair of signals, each having a magnitude dependent upon the intensity of the energy of one of the sheets. An electronic device responds to the magnitudes of the signals to provide an indication of the size or nonsphericity of the particle. In particular, the device responds to the ratio of, or the difference in the magnitudes of the signals to provide an indication of the size of the particle. When the shape of the particle is to be determined, a polarizer and polarization analyzers are inserted in the system, and the electronic device indicates the ratio of depolarized/nondepolarized scattered energy which is a measure of the nonsphericity of the particle.

DESCRIPTION OF THE PREFERRED EMBODIMENT

Figure 1:
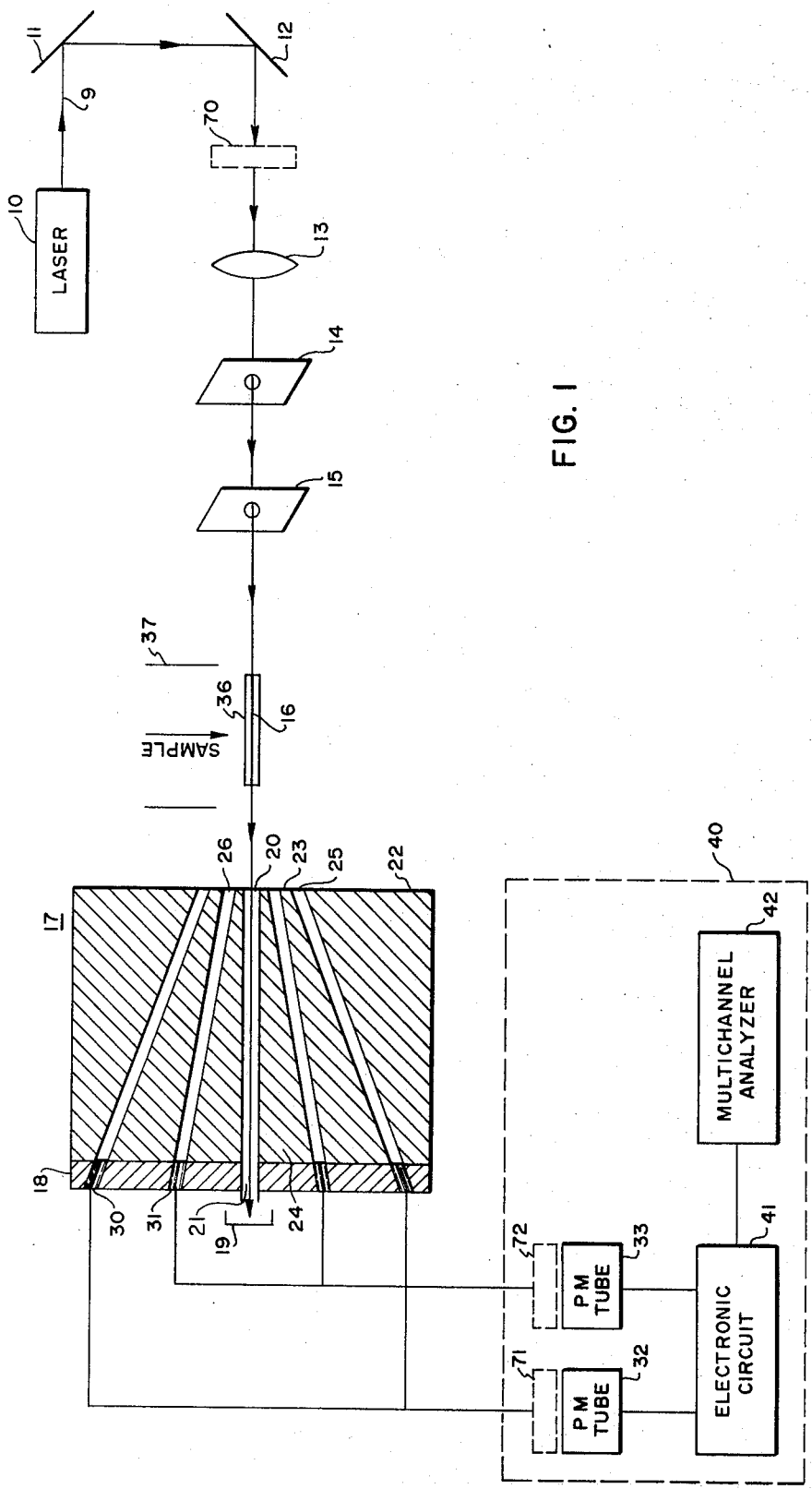
FIG. 1 shows a preferred embodiment of the present invention.

With reference to FIG. 1, a beam of light 9 is provided by laser 10, is directed on mirrors 11 and 12, and reflected to convergent lens 13. The lens focuses the beam through iris diaphrams 14 and 15 to a point 16.

The diaphrams are used to eliminate stray light in the system. After passing through point 16, the beam travels through hole 20 in collector 17 and hole 21 in member 18 to a light trap 19. In the present embodiment, 10 may be a continuous wave argon ion or helium-neon laser although it is understood that other types of radiant energy may be used. If the wavelength of the energy is not visible, optic fibers 30 and 31 and photomultiplier tubes 32 and 33 are replaced in the embodiment described below with suitable, conventional energy detecting means.

Figure 4:
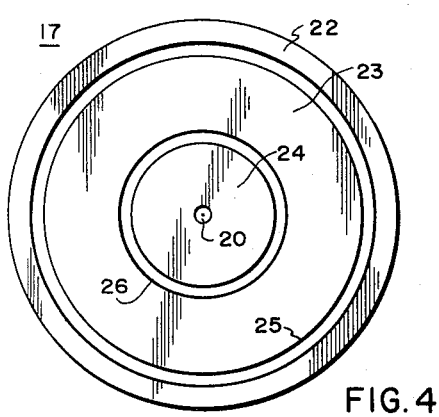
FIG. 4 discloses an end view of the collector used in the embodiment shown in FIG. 1.
Figure 3:
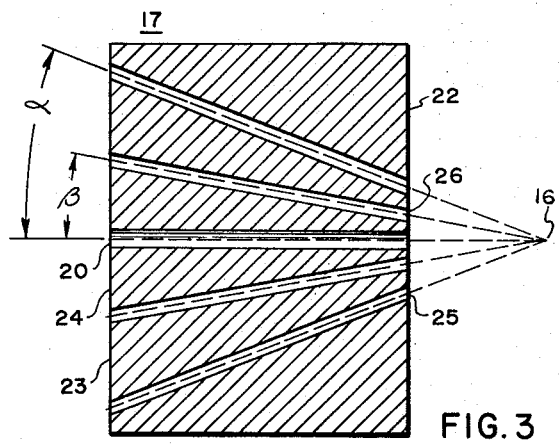
FIG. 3 discloses a section of the collector used in the embodiment shown in FIG. 1.

The collector 17 comprises rings 22, 23, and 24 (FIGS. 1, 3, and 4). As shown in the figures, ring 22 has an inner conical surface, ring 23 has an inner and outer conical surface, while ring 24 has an outer conical surface and inner hole 20. The rings are porportioned and are positioned one within the other by set screws (not shown) in such a way that an aperture 25 is formed between the inner surface of ring 22 and the outer surface of 23, and another aperature 26 is formed between the inner surface of ring 23 and the outer surface 24. The center lines of the apertures 25 and 26 project to an apex which falls on the focal point 16 (FIGS. 1 and 3), and form angles $\alpha$ and $\beta$, respectively, with the projected altitude of the conical surfaces of the apertures.

Figure 6:
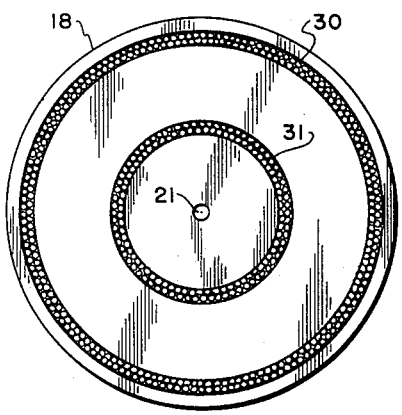
FIG. 6 represents an end view of the optic fiber holder employed in FIG. 1.
Figure 5:
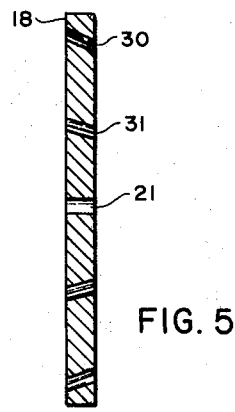
FIG. 5 represents a section of the optic fiber holder employed in FIG. 1.

As shown in FIGS. 1, 5, and 6, a circular member 18 is positioned against the base of collector 17 and supports one end of optic fibers 30 and 31 in annular rings against apertures 25 and 26, respectively. The other ends of fibers 30 and 31 are placed close to the photocathodes of photomultiplier tubes 32 and 33, respectively.

Cylindrical scattering volume 36 in FIG. 1 is defined by the diameter of beam 9 and the fields of view of apertures 25 and 26, where the field of view is the maximum and minumum angles of the apertures. In this embodiment, volume 36 is 0.1 mm in diameter and 0.5 mm long.

A sample of air is introduced into flow tube 37 and is blown through scattering volume 36 by a conventional arrangement (not shown). In this embodiment, the diameter of tube 37 is about 2 mm. Nitrogen is used as a carrier and diluent gas, and a flow rate is chosen such that a particle in the sample takes from 10 $\beta$ sec to 40 $\beta$ sec to pass through volume 36.

In a typical operation, when a particle passes through scattering volume 36, some of the energy in beam 9 is scattered. Scattered energy in the form of conical sheets is transmitted through the apertures 25 and 26 to optic fibers 30 and 31, which transmit the energy to the photocathodes of photomultiplier tubes 32 and 33. The tubes develop a first and second pulse. The width of each pulse is proportional to the time of particle flight through volume 36, and the height is proportional to the intensity of the scattered energy transmitted through the related aperture.

Figure 7:
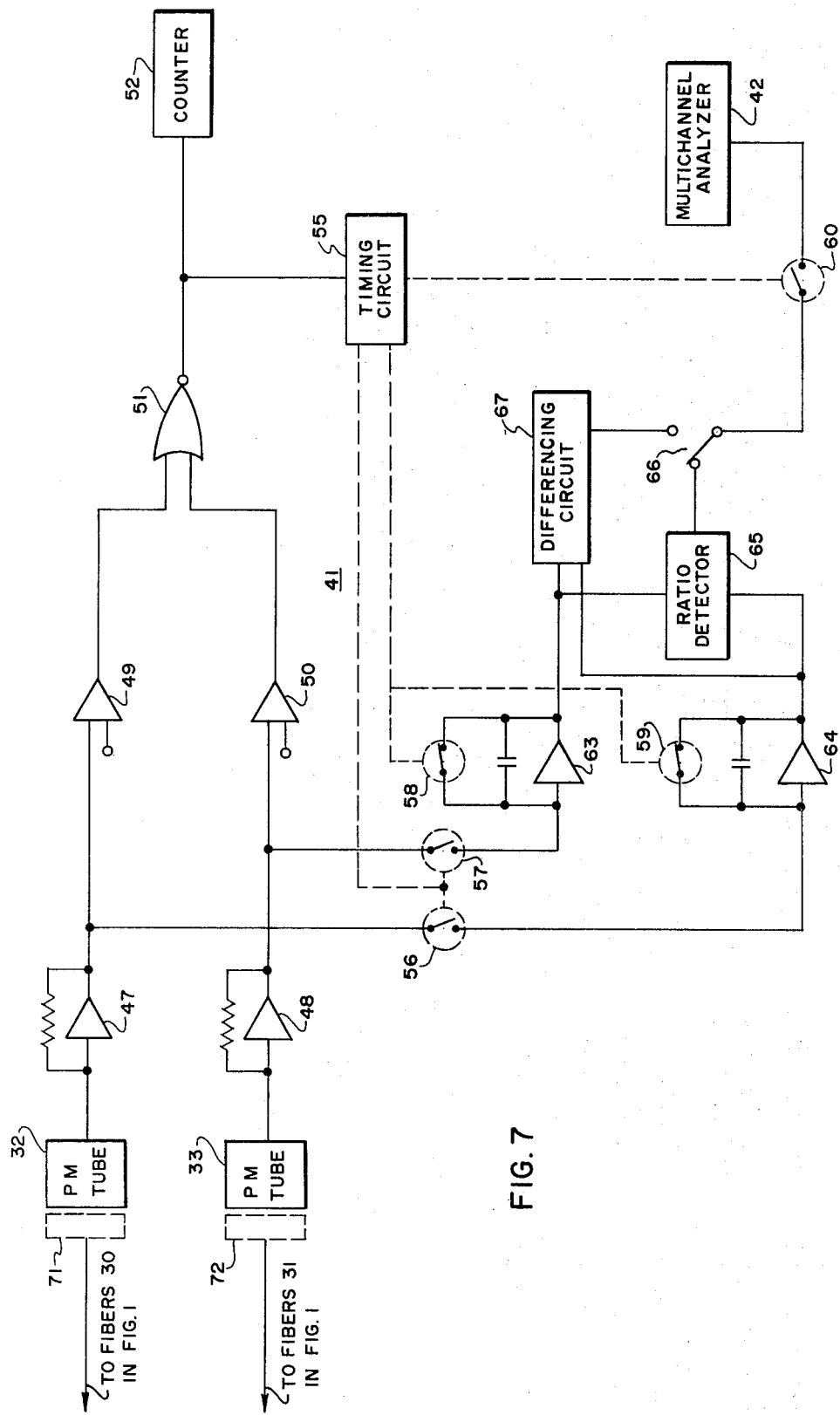
FIG. 7 is a composite block and circuit diagram of the electronic device shown as a block diagram in FIG. 1.

The photomultiplier tubes 32 and 33 are located in device 40 which includes electronic circuit 41 and multichannel analyzer 42 and is shown in detail in FIG. 7. The outputs of tubes 32 and 33 are applied to preamplifiers 47 and 48, respectively, which operate as fixed gain current to voltage converters, and the outputs of the preamplifiers are applied to voltage comparators 49 and 50. The comparison levels in the comparators are set to be slightly above the stray light and random noise level associated with the $\alpha$ and $\beta$ angles, respectively, (FIG. 3). Thus, when a particle is blown through beam 9, each comparator changes its output state for the period that the intensity of the related scattered energy is above the ground level. The output of the comparators are applied to NOR gate 51 to develop an output pulse which is sent to counter 52. The counter provides a count of the total number of particles moved through the beam during a selected interval of time.

The output pulses developed by gate 51 are applied to timing circuit 55, which controls integrators 63 and 64 and their associated components in circuit 41 in such a way that 63 and 64 function as three-state integrators. In a typical operation, assume that 63 and 64 are in their reset stage wherein electronic switches 58 and 59 are closed. Assume further that electronic switches 56, 57, and 60 are open. When a pulse is developed by gate 51 and is applied to timing circuit 55, the timing circuit closes 56 and 57 and opens switches 58 and 59. When 56 and 57 are closed, the outputs of preamplifiers 47 and 48 are applied to integrators 63 and 64, which are activated and apply signals to analog ratio detector 65. The detector develops a pulse proportional to $I_\alpha/I_\beta$, where $I_\alpha$ is the scatter intensity at angle $\alpha$ and $I_\beta$ is the scatter intensity at angle $\beta$. After termination of the pulse developed by 51, switches 56 and 57 are opened and switch 60 is closed by the output of timing circuit 55. The output of detector 65 in then applied to multichannel analyzer 42. A short period thereafter, e.g., 10 $\mu$ sec, switch 60 is opened and switches 58 and 59 are closed by the timing circuit, and integrators 63 and 64 are placed in their reset stage, ready to accept another pulse from gate 51.

Figure 2:
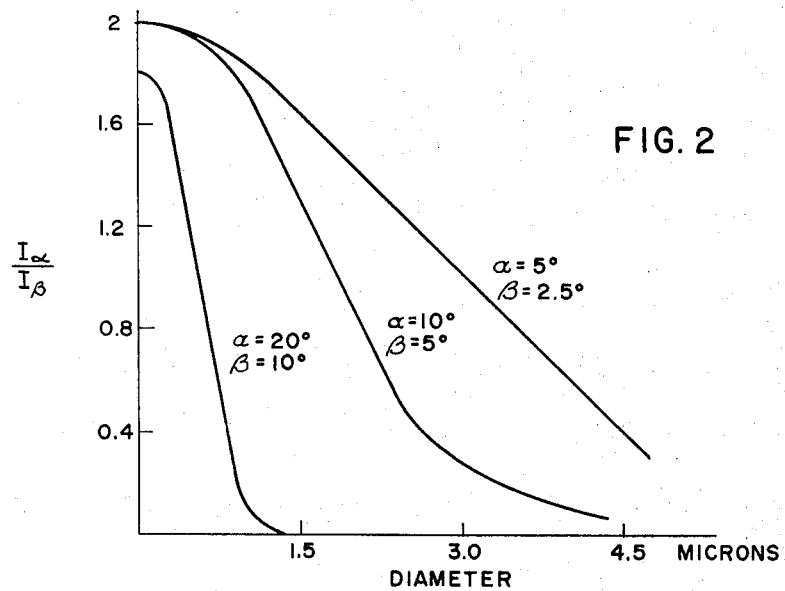
FIG. 2 is a graph representing the dependence of particle diameter on the ratio of the scatter intensity at two angles.

The output of detector 65 is applied through switch 66 to multichannel analyzer 42 which tallys the number of pulses provided by 65 within a particular range of heights and presents this information as channel numbers on a paper tape output. The channel numbers are correlated to particle size by calibrating analyzer 42. This may be done by blowing particles of well-characterized diameter dimensions, e.g., polystyrene latex, through scattering volume 36 (FIG. 1) and then using one of the curves in FIG. 2 to correlate the channel numbers to diameter dimensions. For example, assume that $\alpha=10°$, $\beta=5°$, and that a particle size of 1.5 microns produces a channel number of 50. Then, using the 10°/5° curve in FIG. 2, the abscissa value of 1.5 is used to obtain an ordinate value, which presents 50 in a plot of channel number (ordinate) versus diameter (abscissa).

In another mode of operation, switch 66 in FIG. 7 is thrown to its vertical position. When a particle is blown through scattering volume 36 and switches 56 and 57 are closed by timing circuit 55, the operation of circuit 41 is the same as described immediately above, except that the output of integrators 63 and 64 are applied to differencing circuit 67. Circuit 67 generates a pulse proportional to $I_\alpha-I_\beta$, which is applied to multichannel analyzer 42 to obtain a channel number representing the dimension of the particle's diameter.

Returning to collector 17 in FIGS. 3 and 4, the values selected for $\alpha$ and $\beta$ in a particular embodiment are dependent upon the size distribution of the particles of interest. When ratio detector 65 is used, a 10/5° arrangement for $\alpha/\beta$ provides the best resolution over the diameter range 0.3 to 4.0 micron; 5/2.5° is more effective for particles in the 1.0 to 7.0 micron range; and 20/10° is better for the 0.1 to 1.0 micron range. When differencing circuit 67 is used, a 10/5° arrangement is effective in the 0.05 to 0.3 micron range. Thus, by employing the differencing circuit and ratio detector in a system where $\alpha/\beta$ is 10/5°, it is possible to obtain a range of particle sizing that extends from 0.05 to 4.0 microns.

In another embodiment of the inventive concept, polarizer 70 is positioned between mirror 12 and lens 13 and polarization analyzer 71 and 72 are positioned between the ends of fiber optics 30 and 31 and the photocathodes of photomultiplier tubes 32 and 33, respectively. Polarizer 70 and analyzer 72 pass radiant energy $E_1$ in the same state of polarization while analyzer 71 passes radiant energy $E_2$ in the opposite state of polarization. In this figure, plane polarization is used, and polarizer 70 and analyzer 72 pass radiant energy in a plane that is parallel to the plane of incidence on the particle and analyzer 71 passes energy in the opposite state, that is, perpendicular to the plane. Although the structure is simpler with plane polarization, it is understood that circular or elliptical polarization may be used in this embodiment with suitable polarizers and analyzer. It is also understood that when a laser is used as a source of radiant energy, as shown in FIG. 1, polarizer 70 may not be necessary.

In operation, beam 9 passes through polarizer 70 and impinges on a particle blown through scatter volume 36. The energy scattered at angle $\alpha$ is transmitted through analyzer 71, while the energy scattered at angle $\beta$ is transmitted through analyzer 72. Hence the magnitudes of the pair of signals applied to ratio detector 65 are proportional to the intensity of $E_1$ and $E_2$, respectively, and output of the detector is a function of $E_2/E_1$, which provides an indication of the nonsphericity of the particle. Knowledge of particle shape could be important, for example, in a situation where rod-shaped particles, e.g., asbestos, are being monitored because they are suspected of being cancer inducers.

I claim:

1. In a system for determining parameters of a particle by radiant energy scattering techniques,
   a first, second, and third ring,
   said first ring having an inner conical surface,
   said second ring having an inner and outer conical surface,
   said third ring having an outer conical surface and a center hole,
   said first, second, and third rings being proportioned and positioned in such a way that a first aperture is formed between the inner surface of said first ring and formed between the inner surface of said first ring and the outer surface of said second ring and a second aperture is formed between the inner surface of said second ring and the outer surface of said third ring,
   means for generating a beam of radiant energy,
   means for directing said beam through the center hole in said third ring, whereby a scattering volume is defined by the diameter of said beam and the fields of view of said first and second apertures,
   means for moving at least one particle through said scattering volume, whereby radiant energy in said beam impinges on and is scattered by said particle, and scattered energy passes through the first and second apertures and is transmitted as first and second conical sheets radiant energy, respectively,
   first and second detector means responsive to the first and second sheets of radiant energy for developing first and second signals, respectively, each having a magnitude dependent upon the intensity of a respective one of said sheets of energy, and
   means responsive to the magnitudes of said first and second signals for providing an indication representing a parameter of said particle.

2. The system set forth in claim 1 wherein the means responsive to the magnitudes of said first and second signals comprises:
   means for determining the ratio of the magnitudes of said signals to provide an indication of the size of said particle.

3. The system set forth in claim 1 wherein the means responsive to the magnitudes of said first and second signals comprises:
   means for determining the difference in magnitudes of said signals to provide an indication of the size of said particle.

4. The system set forth in claim 1 wherein the detector means comprises:
   a first and second photomultiplier tube, each having a photocathode,
   first and second optic fibers,
   said first optic fibers being positioned between the photocathode of said first photomultiplier tube and the end of the first aperature furthest from said scattering volume, whereby the output of the first photomultiplier tube comprises said first signal, and
   said second optic fibers being positioned between the photocathode of said second photomultiplier tube and the end of the second aperature furthest from said scattering volume, whereby the output of the second photomultiplier tube comprises said second signal.

5. The system set forth in claim 1 wherein the means for directing said beam comprises:
   means for focusing said beam to a point in said scattering volume.

6. The system set forth in claim 1 including:
   a first and second polarization analyzer positioned between said first and second apertures and said first and second detector means, respectively, whereby the means responsive to the magnitudes of said first and second signals provides an indication of the nonsphericity of said particle.

7. In a system for determining parameters of a particle by radiant energy scattering techniques,
   collector means including a hole and first and second second apertures for transmitting first and second conical, coaxial sheets of radiant energy, respectively,
   means for generating a beam of radiant energy,
   means for directing said beam through the hole in said collector, whereby a scattering volume is defined by the diameter of said beam and the fields of view of said first and second apertures,
   means for moving at least one particle through said scattering volume, whereby radiant energy in said beam impinges on and is scattered by said particle, and scattered energy passes through the first and second apertures and is transmitted as first and second conical sheets of radiant energy, respectively, first and second detector means responsive to the first and second sheets of radiant energy for developing first and second signals, respectively, each having a magnitude dependent upon the intensity of a respective one of said sheets of energy, a first and second polarization analyzer positioned between said first and second apertures and said first and second detector means, respectively, and means responsive to the magnitudes of said first and second signals for providing an indication of the nonsphericity of said particle.

* * * * *

UNITED STATES PATENT OFFICE
CERTIFICATE OF CORRECTION

Patent No. 3,835,315         Dated September 10, 1974

Inventor(s) Claude C. Gravatt, Jr.

It is certified that error appears in the above-identified patent and that said Letters Patent are hereby corrected as shown below:

The inventor's name should read as above. In the Abstract, line 6, "enery" should read --energy--. Column 1, line 37, "Wiler" should read --Wiley--; line 41, the portion of the formula reading "$\theta/20$" should read --$\theta/2$--. Column 3, lines 45 and 46, "$\beta$" should read --$\mu$--. Column 4, line 28, "in" should read --is--. Column 6, line 2, after "sheets" insert --of--.

Signed and sealed this 7th day of January 1975.

(SEAL)
Attest:

McCOY M. GIBSON JR.
Attesting Officer

C. MARSHALL DANN
Commissioner of Patents